US009981383B1

(12) United States Patent
Nagarajan

(10) Patent No.: US 9,981,383 B1
(45) Date of Patent: May 29, 2018

(54) REAL-TIME TRAJECTORY GENERATION FOR ACTUATORS OF A ROBOT TO REDUCE CHANCE OF COLLISION WITH OBSTACLE(S)

(71) Applicant: X Development LLC, Mountain View, CA (US)

(72) Inventor: Umashankar Nagarajan, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 119 days.

(21) Appl. No.: 15/226,717

(22) Filed: Aug. 2, 2016

(51) Int. Cl.
*G05B 19/18* (2006.01)
*B25J 9/16* (2006.01)

(52) U.S. Cl.
CPC ... *B25J 9/1666* (2013.01); *G05B 2219/40476* (2013.01)

(58) Field of Classification Search
CPC .............. B25J 9/1666; G05B 2219/40476
See application file for complete search history.

(56) References Cited

U.S. PATENT DOCUMENTS

| | | | | |
|---|---|---|---|---|
| 5,081,593 A | * | 1/1992 | Pollack | G05B 19/4062 318/568.16 |
| 7,842,904 B2 | * | 11/2010 | Nakata | B23K 9/0671 219/124.01 |
| 9,643,317 B2 | * | 5/2017 | Yajima | B25J 9/1674 |
| 2006/0071625 A1 | * | 4/2006 | Nakata | B25J 9/1633 318/568.12 |
| 2010/0145515 A1 | * | 6/2010 | Nakanishi | B25J 9/1676 700/255 |

OTHER PUBLICATIONS

Kulic, Dana, and Elizabeth Croft. "Pre-collision safety strategies for human-robot interaction." Autonomous Robots 22.2 (2007): 149-164.
Saramago, Sezimária FP, and Valder Steffen Junior. "Optimal trajectory planning of robot manipulators in the presence of moving obstacles." Mechanism and Machine Theory 35, No. 8 (2000): 1079-1094.
Lavalle SM. "Planning Algorithms." Chapter 4, The Configuration Space. Cambridge University press; May 29, 2006. 32 pages.
(Continued)

*Primary Examiner* — Ian Jen
(74) *Attorney, Agent, or Firm* — Middleton Reutlinger

(57) ABSTRACT

Methods, apparatus, systems, and computer readable media are provided for real-time generation of trajectories for actuators of a robot, where the trajectories are generated to lessen the chance of collision with one or more objects in the environment of the robot. In some implementations, a real-time trajectory generator is used to generate trajectories for actuators of a robot based on a current motion state of the actuators, a target motion state of the actuators, and kinematic motion constraints of the actuators. The acceleration constraints and/or other kinematic constraints that are used by the real-time trajectory generator to generate trajectories at a given time are determined so as to lessen the chance of collision with one or more obstacles in the environment of the robot.

19 Claims, 5 Drawing Sheets

(56) References Cited

OTHER PUBLICATIONS

Park et al. Movement Reproduction and Obstacle Avoidance with Dynamic Movement Primitives and Potential Fields. InHumanoids 2008-8th IEEE-RAS International Conference on Humanoid Robots Dec. 1, 2008 (pp. 91-98). IEEE.

Qu et al. A New Analytical Solution to Mobile Robot Trajectory Generation in the Presence of Moving Obstacles. IEEE Transactions on Robotics. Dec. 2004; 20(6):978-93.

Hoffmann et al. "Biologically-Inspired Dynamical Systems for Movement Generation: Automatic Real-Time Goal Adaptation and Obstacle Avoidance." Robotics and Automation, 2009. ICRA'09. IEEE International Conference on IEEE, 2009. 6 pages.

Tsuji et al. "Bio-Mimetic Trajectory Generation of Robots via Artificial Potential Field with Time Base Generator." IEEE Transactions on Systems, Man, and Cybernetics, Part C (Applications and Reviews) 32.4 (2002): 426-439.

Choset, Howie. "Robotic Motion Planning: Configuration Space." Robotics Institute 16-735 with slides from G.D. Hager, Z. Dodds, and Dinesh Mocha. 71 pages. http://www.cs.cmu.edu/~motionplanning/lecture/Chap3-Config-Space_howie.pdf.

* cited by examiner

REAL-TIME TRAJECTORY GENERATION FOR ACTUATORS OF A ROBOT TO REDUCE CHANCE OF COLLISION WITH OBSTACLE(S)

BACKGROUND

A robot may perform a variety of tasks during which an end effector or other component(s) of the robots must move to perform the tasks. A trajectory of the end effector during the movement defines the progression over time of motion states (e.g., position, velocity, acceleration, and/or jerk) of the end effector. Moreover, the trajectory of the end effector during the movement is dictated by the trajectories of actuators of the robot that control the movement of the end effector. Accordingly, the trajectory of the end effector during a movement is dictated by the progression over time of position, velocity, acceleration, and jerk of each of the actuators that control the movement of the end effector.

Various techniques may be employed for determining one or more trajectories to be followed by a robot in performance of a task. For example, some robots may employ a non-real-time trajectory optimizer to determine a trajectory of an end effector. For instance, gradient optimization techniques may be utilized such as techniques that first find a feasible trajectory that satisfies a set of constraints, then iteratively optimize the feasible trajectory to remove redundant and/or "jerky" motion and/or in view of other optimization parameters.

Also, for example, some robots may employ real-time trajectory generation techniques that enable trajectories for actuators to be generated in real-time (e.g., within a control cycle of a robot), while taking into consideration kinematic motion constraints of the robots.

However, some techniques for determining trajectories may suffer from one or more drawbacks. For example, non-real-time trajectory optimization techniques may not be applicable to scenarios where real-time trajectory generation is desirable and/or necessary. Also, for example, some non-real time trajectory optimization techniques and/or some real-time trajectory generation techniques may not enable generation of a trajectory that seeks to reduce a chance of collision of a robot with obstacles, may not account for changes to dynamic obstacles in the environment of the robot, and/or may not enable generation of a trajectory that both seeks to reduce a chance of collision with obstacles and seeks to achieve time efficiency. Additional and/or alternative drawbacks of these and/or other techniques may be presented.

SUMMARY

The present disclosure is generally directed to methods and apparatus for real-time generation of trajectories for actuators of a robot, where the trajectories are generated to lessen the chance of collision with one or more objects in the environment of the robot.

In some implementations, a real-time trajectory generator is used to generate trajectories for actuators of a robot based on a current motion state of the actuators, a target motion state of the actuators (e.g., as supplied by a separate path planner), and kinematic motion constraints of the actuators. The kinematic motion constraints include acceleration constraints for the actuators and optionally include one or more additional constraints such as velocity constraints and/or jerk constraints.

In implementations described herein, the acceleration constraints and/or other kinematic constraints that are used by the real-time trajectory generator to generate trajectories at a given time are determined so as to lessen the chance of collision with one or more obstacles in the environment of the robot. The acceleration constraint(s) for a given actuator at the given time may each be determined based on a configuration of the robot at the given time and based on determining how movement of the actuator in a direction of the acceleration constraint would change the configuration of the robot relative to the one or more obstacles.

For example, assume a given actuator has a maximum/positive acceleration constraint and a minimum/negative acceleration constraint. If it is determined that applying positive acceleration to the given actuator at the current configuration of the robot would cause the configuration to change to a new configuration that is closer to one or more obstacles in the environment, a value of the maximum/positive acceleration constraint for the given actuator may be reduced in magnitude and the reduced value used as the acceleration constraint for an upcoming iteration of the real-time trajectory generator. The maximum/positive acceleration constraint that is reduced may be, for example, an overall default value or a default value for the current configuration. In some implementations, the extent of the reduction of the magnitude may be based on proximity of the obstacle(s) to the current configuration. For example, an obstacle that is 1 foot away may cause a first reduction, an obstacle that is 3 feet away may cause a lesser second reduction, and an obstacle that is more than 5 feet away may not cause any reduction.

In some implementations, a collision value for the given actuator may be identified and used to reduce the constraint. For example, the collision value may indicate the extent of the reduction (e.g., the collision value may be a weighting factor or other weighting function) and/or the collision value may indicate whether a reduction (e.g., a default reduction) should occur. For instance, a collision value that indicates the extent of a reduction may be identified based on determining that applying positive acceleration to the given actuator at the current configuration would cause the current configuration to change to a new configuration that is closer to the object, and based on proximity of the current configuration to the object. In some implementations, a mapping of obstacle(s) in a configuration space of the robot may be utilized to determine the extent of reduction (if any) of a kinematic motion constraint for an actuator based on proximity of one or more of the obstacles to the current configuration. For example, the mapping of the obstacles in the configuration space may include a mapping of collision values in the configuration space, where the collision values are each based on proximity to one or more obstacles. The collision values in the configuration space may be, for example, weighting functions that are utilized to reduce a kinematic motion constraint. The collision value for a current configuration may be determined, for example, based on the collision value and the current configuration being mapped to the same point in the configuration space.

If it is determined that applying positive acceleration to the given actuator at the current configuration of the robot would cause the configuration to change to a new configuration that is farther away from one or more (e.g., any) obstacles in the environment (and/or to a new configuration that maintains the distance relative to the obstacles), a value of the maximum/positive acceleration constraint may be maintained or increased in magnitude and the maintained or increased value used as the maximum/positive acceleration constraint for an upcoming iteration of the real-time trajectory generator. In some of those implementations, a collision value may be used to increase or maintain a default constraint and may indicate the extent of the increase (if any) and/or may indicate whether a modification to the constraint should occur. Moreover, in some implementations it may be determined that a current configuration is far enough away from any obstacles. Based on that determination, a collision value may be identified (e.g., inferred) that indicates default constraints for all actuators should be maintained.

Various technical effects may be achieved according to various implementations disclosed herein. For example, dynamic adjustment of the acceleration constraints for each of the actuators in view of obstacles in the environment of the robot, and use of such dynamically adjusted constraints by the real-time trajectory generator will cause the real-time trajectory generator to iteratively generate trajectories toward one or more target waypoints such that the trajectories avoid obstacles in the environment. As another example, since the trajectories may be iteratively updated in real-time, the trajectories may be adapted to dynamic obstacles as obstacle detectors and/or other components provide updated information regarding those dynamic obstacles for use in adjustment of the acceleration constraints. Moreover, in various implementations of adjusting one or more acceleration constraints of a robot based on obstacle(s), the acceleration constraint(s) may be adjusted to a degree that is based on proximity of obstacle(s) to a current configuration of the robot. Additionally or alternatively, in various implementations one or more acceleration constraints may be set to a default (e.g., a default maximum/minimum) in scenarios where a current configuration is not proximal to any obstacles and/or in scenarios where a current configuration and corresponding acceleration cause the configuration to change to a new configuration that is farther away from obstacle(s). Implementations that implement one or both of the techniques of the preceding two sentences may promote avoidance of collision with obstacles, while still promoting time efficiency in generated trajectories.

Regardless of the particular technique(s) utilized to generate trajectories that lessen the chance of collision with one or more objects, the trajectories may be provided for operating the actuators of the robot. For example, the trajectories may be provided to one or more low level controllers for generating control commands based on the generated trajectories and providing those control commands to drivers associated with corresponding actuators.

In some implementations, a method implemented by one or more processors may be provided that includes identifying a current configuration of a dynamic configuration of a robot. The current configuration of the robot specifies a pose for each of a plurality of actuators of the robot. The method further includes identifying, for each of the plurality of actuators of the robot: a first collision value for actuation of the actuator in a first direction, and a second collision value for actuation of the actuator in a second direction. The first collision value and the second collision value are each identified based on the current configuration and based on information related to one or more obstacles in an environment of the robot. The method further includes: determining one or more first direction kinematic motion constraints for the actuators based on the first collision values of the actuators; determining one or more second direction kinematic motion constraints for the actuators based on the second collision values of the actuators; identifying a target motion state of the actuators of the robot; and generating, for each of the actuators in real-time, a trajectory that defines motion states for the actuator. The trajectories transfer a current motion state of the actuators to the target motion state of the actuators and generating the trajectories is based on: the current motion state of the actuators, the target motion state, the first direction kinematic motion constraints of the actuators, and the second direction kinematic motion constraints of the actuators. The method further includes providing the trajectories for operating the actuators of the robot.

This method and other implementations of technology disclosed herein may each optionally include one or more of the following features.

In some implementations, identifying the first collision value for a given actuator of the actuators includes: identifying the first collision value based on determining that actuation of the given actuator in the first direction causes a change to the dynamic configuration that causes the dynamic configuration to move closer to one or more of the obstacles; and determining the first direction kinematic motion constraint for the given actuator includes: reducing a default first direction kinematic motion constraint in view of the first collision value. In some of those implementations, the first collision value is a weighting function for modifying the first direction kinematic motion constraint for the given actuator, and reducing the default first direction kinematic motion constraint is based on the weighting function. The weighting function may be dependent on proximity of one or more of the obstacles to the current configuration.

In some implementations, when actuation of a given actuator of the actuators in the first direction causes change to the dynamic configuration that causes the dynamic configuration to move closer to one or more of the obstacles: the first collision value for the given actuator causes the determined first direction kinematic motion constraint for the given actuator to be of a lesser magnitude than the first direction kinematic motion constraint would be if the actuation of the given actuator in the first direction instead indicated change to the dynamic configuration that causes the dynamic configuration to move farther from the obstacles.

In some implementations, the information related to the one or more obstacles includes a mapping of the one or more obstacles in a configuration space of the robot and identifying the first collision value for a given actuator of the actuators includes: identifying the first collision value based on a mapping of the current configuration to the configuration space and based on the mapping of the obstacles in the configuration space. In some of those implementations, the mapping of the one or more obstacles in the configuration space includes a mapping of collision values in the configuration space and each of the collision values indicates proximity to one or more of the obstacles. In some versions of those implementations, identifying the first collision value based on the mapping of the current configuration in the configuration space and based on the mapping of the obstacles in the configuration space includes: determining that the first collision value is the collision value mapped to the same point in the configuration space as the current configuration.

In some implementations, identifying the first collision value for a given actuator of the actuators includes identifying the first collision value based on determining that actuation of the given actuator in the first direction causes a change to the dynamic configuration that causes the dynamic configuration to move away from the obstacles; and determining the first direction kinematic motion constraint for the given actuator includes maintaining a default first direction kinematic motion constraint in view of the first collision value.

In some implementations, the one or more first direction kinematic motion constraints for the actuators determined based on the first collision measures of the actuators include acceleration constraints.

In some implementations, determining the first direction kinematic motion constraint for a given actuator of the actuators includes reducing a default first direction kinematic motion constraint for the given actuator based on the first collision value, and determining the second direction kinematic motion constraint includes maintaining a default second direction kinematic motion constraint for the given actuator based on the second collision value.

In some implementations, the method further includes generating control commands based on the trajectories and providing the control commands to drivers associated with the actuators for operating of the actuators of the robot based on the trajectories.

In some implementations, the target motion state is received from a path planner of the robot.

In some implementations, a method implemented by one or more processors may be provided that includes identifying a current configuration of a dynamic configuration of a robot. The current configuration of the robot specifies a pose for each of a plurality of actuators of the robot. The method further includes determining, for a given actuator of the actuators of the robot and based on the current configuration, a first kinematic motion constraint based on a first effect that would result from actuation of the given actuator. The first effect indicates change to the dynamic configuration relative to one or more obstacles. The method further includes identifying a target motion state of the actuators of the robot and generating, for each of the actuators in real-time, a trajectory that defines motion states for the actuator. The trajectories transfer a current motion state of the actuators to the target motion state of the actuators and generating the trajectory for the given actuator is based on: the current motion state of the actuators, the target motion state, the first kinematic motion constraints of the given actuator, and one or more additional kinematic motion constraints of the given actuator. The method further includes providing the trajectories for operating the actuators of the robot.

This method and other implementations of technology disclosed herein may each optionally include one or more of the following features.

In some implementations, determining the first kinematic motion constraint based on the first effect that would result from actuation of the given actuator includes: determining that actuation of the given actuator in a first direction corresponding to the first kinematic motion constraint causes a change to the dynamic configuration that causes the dynamic configuration to move closer to one or more of the obstacles; and in response to determining that the first kinematic motion constraint causes the change, determining the first kinematic motion constraint by reducing a default first direction kinematic motion constraint. In some of those implementations, determining the first kinematic motion constraint based on the first effect that would result from actuation of the given actuator further includes: identifying a collision value based on a mapping of the one or more obstacles in a configuration space of the robot and based on a mapping of the current configuration to the configuration space; and determining the first direction kinematic motion constraint based on the collision value. In some of those implementations, each of the collision values indicates proximity to one or more of the obstacles. In some of those implementations, identifying the collision value based on the mapping of the current configuration in the configuration space and based on the mapping of the obstacles in the configuration space includes: determining that the first collision value is the collision value mapped to the same point in the configuration space as the current configuration.

Other implementations may include one or more non-transitory computer readable storage media storing instructions executable by one or more processors to perform a method such as one or more of the methods described above. Yet another implementation may include a robot and/or robotic control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates the robot in a first configuration (solid lines) and a second configuration (broken lines), and also illustrates three different example poses of an example object in the environment of the robot.

DETAILED DESCRIPTION

As used herein, a trajectory of a component defines one or more motion states (e.g., position, velocity, acceleration, and/or jerk) of the component over time. A trajectory of an end effector of a robot is dictated by the trajectories of actuators of the robot that control the movement of the end effector. Accordingly, the trajectory of the end effector is dictated by the progression over time of position, velocity, acceleration, and jerk of each of the actuators that control the movement of the end effector.

The present disclosure is generally directed to methods and apparatus for real-time generation of trajectories for actuators of a robot, where the trajectories are generated to lessen the chance of collision with one or more objects in the environment of the robot.

In some implementations, a real-time trajectory generator is used to generate trajectories for actuators of a robot based on a current motion state of the actuators, a target motion state of the actuators, and kinematic motion constraints of the actuators. The kinematic motion constraints include acceleration constraints for the actuators and optionally include one or more additional constraints such as velocity constraints and/or jerk constraints. In implementations described herein, the acceleration constraints and/or other kinematic constraints that are used by the real-time trajectory generator to generate trajectories at a given time are determined so as to lessen the chance of collision with one or more obstacles in the environment of the robot. For example, the acceleration constraints for a given actuator at the given time may each be determined based on a configuration of the robot at the given time and/or based on determining how movement of the given actuator in a direction of the acceleration constraint would change the configuration of the robot relative to the one or more obstacles.

Figure 1:
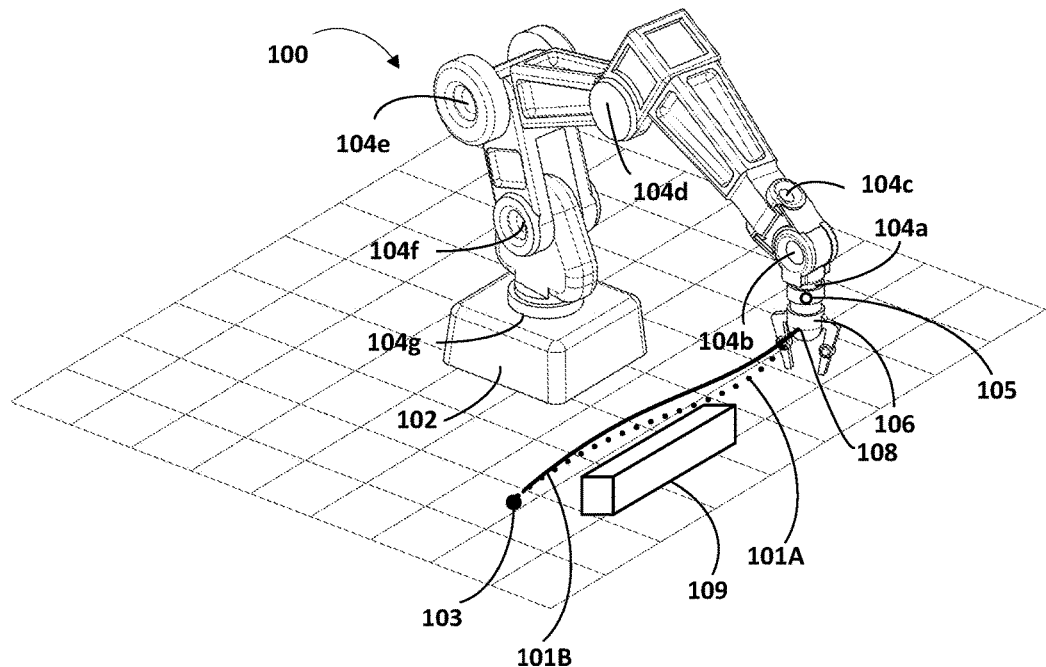
FIG. 1 illustrates an example robot and graphical representations of: (a) positions traversed by a reference point of an end effector of the robot to reach a target waypoint based on trajectories of actuators of the robot that are not generated to lessen the chance of collision with objects in the environment; and (b) positions traversed by the reference point to reach the target waypoint based on trajectories of the actuators that are generated to lessen the chance of collision with objects in the environment.

With reference to FIG. 1, one example is provided of a comparison of trajectories of actuators generated to lessen the chance of collision of robot 100 with obstacle 109 in an environment of the robot 100 to trajectories of actuators that are not generated to lessen the chance of collision with the obstacle 109.

The robot 100 of FIG. 1 is in a form often referred to as a "robot arm" and includes a base 102 and a plurality of actuators. Seven of the actuators of robot 100 are referenced in FIG. 1 with 104a-g. It is understood that the actual "actuators" are "under" the exterior surfaces of robot 100 indicated by references 104a-g. Each of the actuators 104a-g provides a degree of freedom of movement for the robot 100 and the motion states of the actuators 104a-g dictate the motion state of the end effector 106. For example, the position of the end effector 106 in FIG. 1 is dictated by the positions of the actuators 104a-g in FIG. 1. In some implementations, each of the actuators 104a-g may be a servo motor that enables controllable rotation, about a respective axis, in a first direction and/or a second direction.

The actuators 104a-g enable the end effector 106 to move with any one of a plurality of trajectories when moving a reference point 108 of the end effector 106 from a first position of a current motion state of the end effector 106 to a second position of a target motion state. In some implementations, the position of the end effector may be the position of a reference point of the end effector, such as reference point 108. In some implementations, the reference point of an end effector may be a center of mass of the end effector, and/or a point near where end effector attaches to other components of the robot, though this is not required.

Robot 100 may include other actuators in addition to actuators 104a-g, but those are not labeled in FIG. 1 for the sakes of clarity and brevity. As used herein, an "actuator" of a robot may refer to motors (e.g., servo motors), joints, shafts, gear trains, pumps (e.g., air or liquid), pistons, drives, and/or other components that may create and/or undergo propulsion, rotation, and/or motion. An actuator may optionally have an associated driver that receives control commands for driving the actuator and converts those control commands into one or more signals for driving the actuator.

Figure 2:
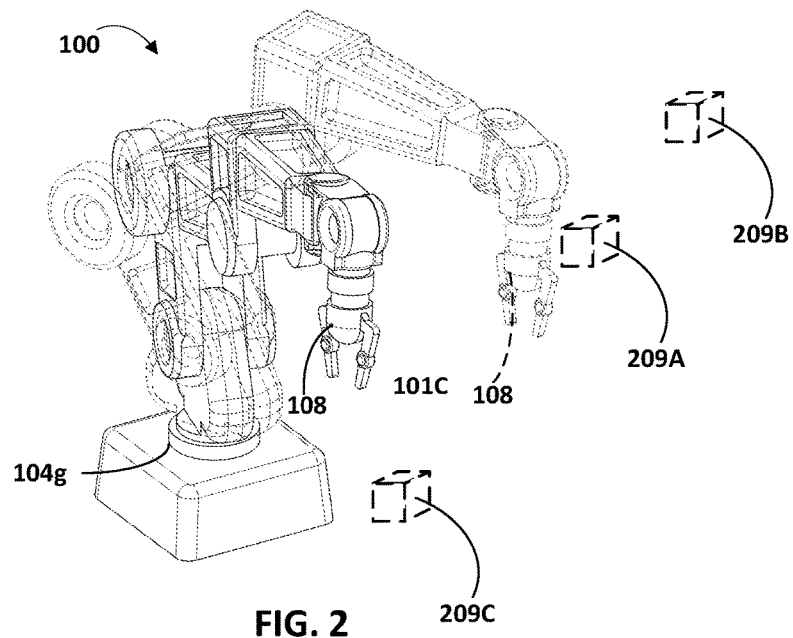
FIG. 2 illustrates the example robot of FIG. 1.

As used herein, "end effector" may refer to a variety of tools that may be operated by robot 100 in order to accomplish various tasks. In FIGS. 1 and 2 herein, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

In FIG. 1, dotted line segment 101A illustrates positions traversed by a reference point 108 of an end effector of the robot to reach a target waypoint 103 based on trajectories of actuators of the robot that are not generated to lessen the chance of collision with objects in the environment. For example, the segment 101A may be traversed based on time-optimal trajectories that are generated based on static maximum/minimum kinematic motion constraints, where the static constraints are set to achieve time-optimal performance within constraints of the actuators 104a-g.

In FIG. 1, solid line segment 101B indicates positions traversed by the reference point 108 to reach the target waypoint 103 based on trajectories of the actuators that are generated to lessen the chance of collision with objects in the environment. For example, the segment 101B may be traversed based on trajectories that are generated based on one or more dynamic kinematic motion constraints, where the dynamic kinematic motion constraints are generated in view of the obstacle 109 to dampen and/or prevent acceleration, by one or more of the actuators 104a-g, that is toward the obstacle 109 at one or more configurations of the robot 100. For instance, the trajectories may be generated by a real-time trajectory generator based on kinematic motion constraints of the actuators (that include one or more of the dynamic kinematic motion constraints), a current motion state of the actuators, and a target motion state of the actuators.

As appreciated when viewing FIG. 1, if reference point 108 traverses positions indicated by segment 101A, end effector 106 will undesirably contact obstacle 109 at one or more of those positions. On the other hand, if reference point 108 traverses position indicated by segment 1016, end effector 106 will not contact obstacle 109. Accordingly, even though in some situations traversal of positions indicated by segment 101A may be more time-optimal than traversal of positions indicated by segment 1016 (e.g., one or more actuators may operate at or closer to one or more of their true maximum/minimum kinematic constraints (e.g., acceleration and/or jerk) when traversing 101A than when traversing 101B), traversal of positions indicated by segment 1016 may be more desirable.

In some implementations, a path planner or other component may provide a target motion state that indicates end effector 106 should transition from its current motion state to a motion state where the reference point 108 is positioned at waypoint 103, such as a target motion state where the reference point 108 is positioned at waypoint 103 with the end effector 106 at zero velocity. In many implementations, the path planner may provide multiple sequential waypoints to be achieved, such as one or more waypoints that are between waypoint 103 and the illustrated current position of the reference point 108.

It is noted that in some implementations the path planner may detect the obstacle 109 and generate the waypoint 103 and/or intermediary waypoint(s) in view of avoiding the obstacle. However, in many of those implementations it may still be desirable to generate, by a real-time trajectory generator, trajectories that traverse the reference point 108 to the waypoint(s), but that are also influenced by obstacle 109. For example, in some of those situations, generating the trajectories without influence by obstacle 109 may still lead to undesired contact with the obstacle 109 and/or undesired proximity to the obstacle 109. Also, for example, in some of those situations, generating the trajectories with influence by the obstacle 109 will minimize or prevent the occurrence of the actuators 104a-g being in motion states where they could not adapt to an unexpected movement of the obstacle 109. Also, for example, in some of those situations, generating the trajectories with influence by the obstacle 109 may take into account movement of the obstacle 109 that occurs subsequent to the generation of the waypoints generated by the path planner and may enable adaptation to such subsequent movement.

Turning now to FIG. 2, the robot 100 of FIG. 1 is illustrated with limited numbering for the sake of simplicity. FIG. 2 illustrates a first configuration of the robot 100 in solid lines. The first configuration specifies a group of particular poses (positions and orientations) for each of the actuators 104a-g of the robot. FIG. 2 also illustrates a second configuration of the robot 100 in broken lines. The second configuration illustrates an example of how the dynamic configuration of the robot would change from the first configuration (solid lines) in response to actuation of the actuator 104g in a first direction for a given amount of time without actuation of any other of the actuators 104a-f.

FIG. 2 also illustrates three different example poses 209A, 209B, and 209C of an example object in the environment of the robot. As can be appreciated by viewing FIG. 2, when the object is at pose 209C, the second configuration (broken lines) of the robot 100 is farther from the object than is the first configuration (solid lines). If, on the other hand, the object is at the pose 209A or at the pose 209B, then the second configuration (broken lines) of the robot 100 is closer to the object than is the first configuration (solid lines). Moreover, when the object is at the pose 209A, the second configuration (broken lines) of the robot 100 is closer to the object than when the object is at the pose 209B.

As described herein, one or more kinematic motion constraint(s) of actuator 104g, for a given iteration of generating real-time trajectories for actuator 104g and other actuators 104a-f, can be based on how the dynamic configuration of robot 100 changes relative to one or more obstacles in response to actuation of the actuator 104g. For example, as described above, when the object is at the pose 209C, movement of the actuator 104g in the first direction causes the dynamic configuration of robot 100 to move farther away from the object. In some of those situations, an acceleration constraint for the actuator 104g in the first direction may be set to a "default" maximum/minimum value based on determining that movement in the first direction moves the configuration away from the object. As another example, as described above, when the object is at the pose 209A or pose 209B, movement of the actuator 104g in the first direction causes the dynamic configuration of robot 100 to move closer to the object. In some of those situations, an acceleration constraint for the actuator 104g in the first direction may be a value that is reduced in magnitude relative to the default maximum/minimum value based on determining that movement in the first direction moves the configuration toward the object. In some versions of those implementations, the extent of reduction may be greater when the object is at the pose 209A than when the object is at the pose 209B. For example, the extent of the reduction may be greater when the object is at the pose 209A than when the object is at the pose 209B due to, for example, the pose 209A being more proximal to the first configuration (solid lines) of robot 100 than the pose 209B is to the first configuration.

Figure 3:
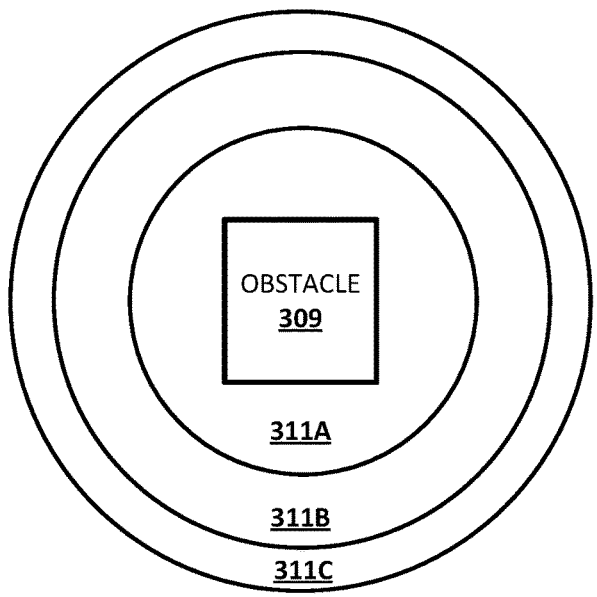
FIG. 3 illustrates an example of an obstacle and example areas that may be defined relative to the obstacle.

One example of determining the extent of reduction of a kinematic constraint based on proximity of an obstacle to a configuration (e.g., a current configuration) of a robot is generally illustrated in FIG. 3. FIG. 3 illustrates an example of an obstacle 309 that occupies an area indicated by the rectangle of FIG. 3. Also illustrated in FIG. 3 are areas 311A-C that surround the obstacle 309 and that define a gradient of collision values relative to the obstacle 309. Although obstacle 309 and areas 311A-C are illustrated two-dimensionally in FIG. 3 for the sake of simplicity, it is understood that they may each be defined three-dimensionally and/or in another multi-dimensional space.

Each of the collision values defined for the areas 311A-C may be a weighting factor and/or a function that indicates how one or more kinematic motion constraint(s) (e.g., an acceleration constraint) should be modified when a configuration of a robot is in the particular area. For example, the collision value defined for the particular inner area 311A around the obstacle 309 may indicate a most extensive reduction in an acceleration constraint (since it is defined for the area 311A that is most proximal to the obstacle 309). The collision value defined for intermediate area 311B that surrounds the inner area 311A may indicate a reduction in an acceleration constraint that is less extensive than the reduction defined by the collision value for the inner area 311A. The collision value defined for outer area 311C that surrounds the intermediate area 311B may indicate a reduction in an acceleration constraint that is less extensive than the reduction defined by the collision value for the intermediate area 311B. Collision values beyond the area 311C may indicate that no reduction in an acceleration constraint should occur.

As one particular example, assume the collision value for area 311A is a weighting factor of "0.1", the collision value for area 311B is a weighting factor of "0.5", and the collision value for area 311C is a weighting factor of "0.8". Further assume that movement of an actuator of a robot in a first direction would cause a current configuration to move closer to the obstacle 309 and assume that the default acceleration constraint for the actuator in the first direction is 1.0 m/s$^2$. If the current configuration of the robot is in the area 311C, then the constraint may be adjusted to 0.8 m/s$^2$ (1 m/s$^2$*0.8), and that constraint used as the acceleration constraint for the actuator in the first direction in a next iteration of trajectory generation by a real-time trajectory generator. If the current configuration is in the area 331B, then the constraint may be adjusted to 0.5 m/s$^2$ (1 m/s$^2$*0.5), and that constraint used as the acceleration constraint for the actuator in the first direction in a next iteration of trajectory generation by a real-time trajectory generator. If the current configuration is in the area 331B, then the constraint may be adjusted to 0.1 m/s$^2$ (1 m/s$^2$*0.1), and that constraint used as the acceleration constraint for the actuator in the first direction in a next iteration of trajectory generation by a real-time trajectory generator. If the current configuration is in an area that is outside of the areas 331A-C, and outside of any areas of other object(s), then the constraint may be maintained at 1.0 m/s², and that constraint used as the acceleration constraint for the actuator in the first direction in a next iteration of trajectory generation by a real-time trajectory generator. The constraint may be maintained based on an inferred or otherwise identified collision value for that area that indicates the constraint should be maintained. For example, a collision value with a weighting factor of "1.0" may be explicitly defined for that area, or a collision value inferred for that area based on no other weighting factor being explicitly defined for that area.

Although examples of three discrete areas 311A-C and certain collision values are provided with reference to FIG. 3, many variations are possible. For example, more or fewer areas may be provided, non-spherical areas may be provided, collision values may be defined as multi-factor functions, the "areas" and collision values may be defined via a configuration space, etc.

In some implementations, one or more obstacles in the environment of a robot may be mapped in a configuration space of the robot. For example, the obstacles may be defined by collision values in the configuration space, where the collision value of an obstacle at a given point in the configuration space indicate proximity of the obstacle to that point in the configuration space. For instance, a "gradient" of collision values (e.g., similar to the gradients of FIG. 3) may be defined for an object as weighting functions, where the weighting functions at points in the configuration space that are near the object's position in the configuration space may cause a greater reduction than the weighting functions at points that are farther from the object's position in the configuration space. As one particular example, the obstacle 309 of FIG. 3 may be mapped to a position in the configuration space and the weighting function at that point may cause the greatest reduction. At initial points in the configuration space that immediately border that point, the weighting function may cause less of a reduction. At further points that immediately border the initial points, the weighting function may cause even less of a reduction. At yet farther points that are at least a threshold distance away from any objects in the configuration space, the weighting function may be omitted and/or may explicitly indicate that no reduction is needed (e.g., a weighting factor of "1"). In implementations where multiple objects are mapped in a configuration space, one or more weighting functions may be influenced by multiple objects. For example, for a given point in the configuration space that is proximal to two separate objects, the weighting function may be a function of the proximity to the first object and the proximity to the second object.

In some of the implementations where obstacles are mapped in a configuration space of the robot, prior to a given iteration of the real-time trajectory generator, the current configuration of the robot may be mapped to the configuration space. Each of the actuators may be analyzed with reference to the mapping in the configuration space to determine how movements of the actuator alter the configuration in the configuration space. For a movement of the actuator that moves the configuration closer to objects in the configuration space (e.g., toward collision values in the configuration space that are more indicative of collision than those of the current configuration), the corresponding acceleration constraint for the actuator may be reduced in magnitude and the reduced value used in the given iteration of the real-time trajectory generator. In some of those implementations, the extent of the reduction may be based on the collision value at the point in the configuration space that corresponds to the current configuration and/or based on one or more neighboring collision values. For a movement of the actuator that moves the configuration farther from the objects (e.g., toward collision values in the configuration space that are less indicative of collision than those of the current configuration), a magnitude of the corresponding acceleration constraint for the actuator may be maintained or increased, and the maintained or increased value used in the given iteration of the real-time trajectory generator.

Figure 4A:
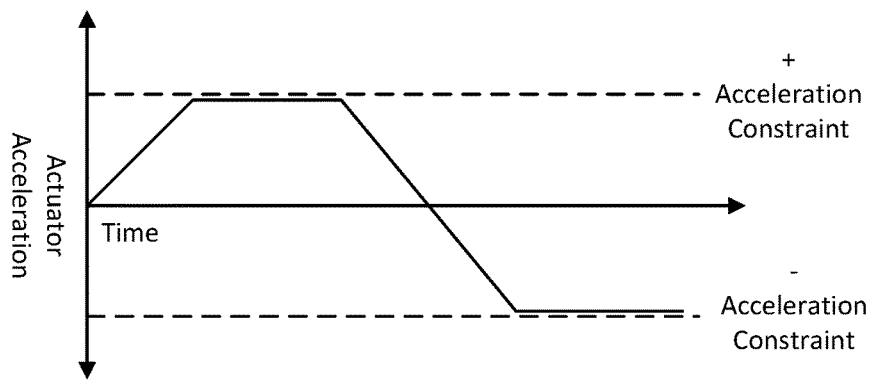
FIGS. 4A and 4B depict example acceleration profiles of an actuator that may be generated as trajectories for the actuator and illustrates how determined acceleration constraints may constrain the acceleration profiles.
Figure 4B:
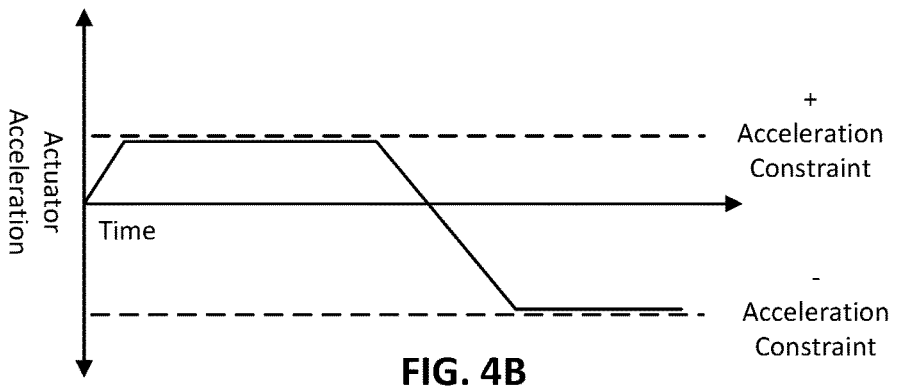

FIGS. 4A and 4B depict example acceleration profiles of an actuator that may be generated as trajectories for the actuator and illustrates how determined acceleration constraints may constrain the acceleration profiles. Each of the profiles illustrates an example acceleration profile that may be generated by a real-time trajectory generator according to some implementations. In FIG. 4A, the positive/maximum acceleration constraint of the actuator and the negative/minimum acceleration constraint of the actuator are both set to "default" values. For example, they may be set to default values based on a determination that an associated current configuration is not within a threshold distance of any objects. In FIG. 4A, the acceleration profile reaches both the positive/maximum acceleration constraint of the actuator and the negative/minimum acceleration constraint. Although symmetric default acceleration constraints are illustrated in FIG. 4A, one or more actuators may have asymmetric default acceleration constraints and/or other asymmetric kinematic motion constraints.

In FIG. 4B, the positive/maximum acceleration constraint of the actuator has been reduced relative to that of FIG. 4A. For example, it may be reduced based on a determination that an associated current configuration is within a threshold distance of an object and a determination that acceleration of the actuator in the associated direction would cause movement toward a new configuration that is more proximal to the object than is the current configuration. In FIG. 4B, the acceleration profile is constrained by the reduced positive/maximum acceleration constraint. In other words, it approaches or reaches the reduced constraint, but is not allowed to extend beyond that reduced constraint.

Figure 5:
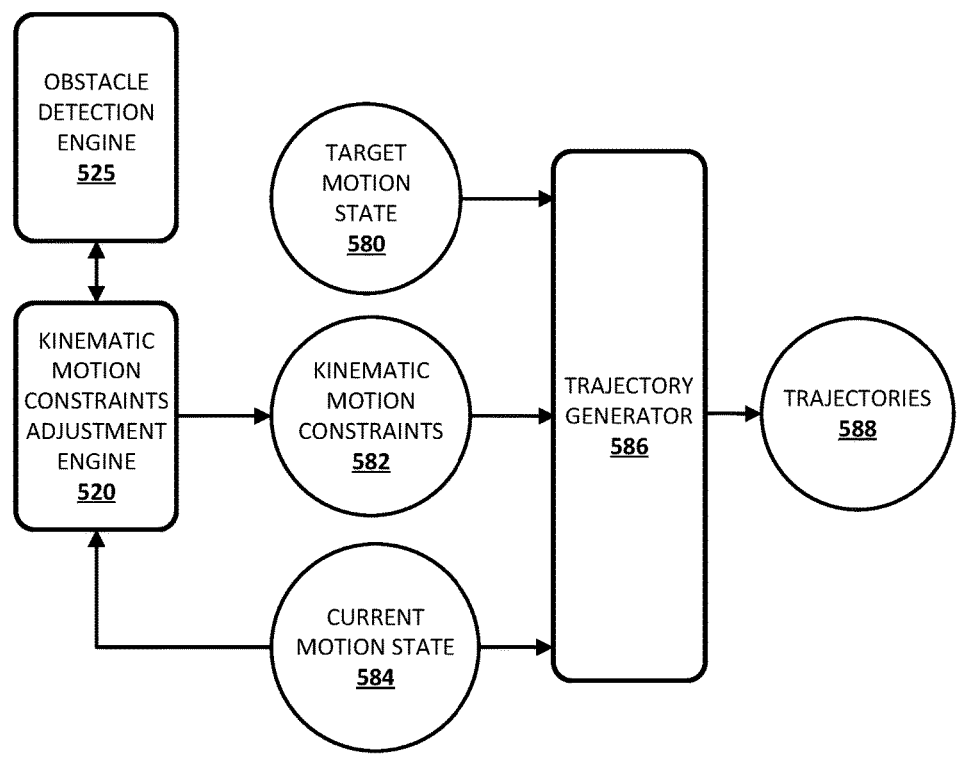
FIG. 5 illustrates an example environment in which implementations disclosed herein may be implemented.

FIG. 5 illustrates an example environment in which implementations disclosed herein may be implemented. The environment includes a trajectory generator 586, a kinematic motion constraints adjustment engine 520, and an obstacle detection engine 525. The trajectory generator 586, engine 520, and/or engine 525 may be implemented by one or more processors, such as one or more processors that are local to a robot and/or that are in communication with (but separate from) the robot.

The trajectory generator 586 generates trajectories 588 in real-time based on a current motion state 584 of actuators of the robot, a target motion state 580 of the actuators, and kinematic motion constraints 582 of the actuators. In some implementations, generating trajectories in real-time means generating trajectories within a control cycle of a robot for which the trajectories are generated.

The target motion state 580 defines a desired motion state to be reached by the actuators of a robot, such as robot 100. For example, the target motion state may define particular positions of the actuators and zero velocity, zero acceleration, etc. For instance, the target motion state may be a motion state where the positions of the actuators cause an end effector to be at a particular position and maintain that position. As another example, the target motion state may define particular positions of the actuators and non-zero velocities, accelerations, and/or jerks for one or more of the actuators. For instance, the target motion state may be a motion state that causes an end effector to be at a particular position and arrive at that position with a particular velocity.

Various techniques may be utilized to determine the target motion state. For example, the target motion state may be provided by a path planner of the robot. Also, for example, the path planner may provide a target motion state of an end effector, and the target motion state for the actuators may be determined based on the target motion state of the end effector. For instance, the path planner may provide a target motion state of the end effector that is a waypoint in Cartesian space and the target motion states of the actuators in joint space determined based on applying that waypoint to a kinematic model of the robot (to determine positions of actuators that will cause a reference point of the end effector to be at that waypoint).

In some implementations, the target motion state for actuators may be based on inputted value(s), value(s) retrieved from hardware memory accessible to trajectory generator 586, and/or other values. For example, the target motion state may be determined based on a waypoint defined in response to a user providing input via one or more user interface input devices of a computing device. For instance, the computing device may generate a graphical user interface displaying an environment around a robot and the user may provide input via the graphical user interface to select a position in the environment to utilize as the waypoint. Also, for example, the target motion state may be determined based on a waypoint defined as part of a program or task being executed by the robot. For instance, the robot may be programmed to move a reference point of the robot from a current position to one or more waypoints upon occurrence of one or more events, such as upon the occurrence of certain output from one or more sensors of the robot. Also, for example, the target motion state may be determined based on a waypoint determined based on sensor data from one or more sensors of the robot. For instance, image data from a stereographic camera may be utilized to detect an object in a robot's environment and a waypoint determined to reach the object.

The current motion state 584 defines a current motion state of the actuators of a robot, such as robot 100. For example, when the robot is currently stationary, the current motion state may define particular positions of the actuators and zero velocity, zero acceleration, etc. Also, for example, when the robot is currently in motion, the current motion state may define particular positions of the actuators and non-zero velocities, accelerations, and/or jerks for one or more of the actuators.

The kinematic motion constraints 582 define constraints for each of the actuators. The kinematic motion constraints 582 may include, for example, minimum/maximum velocities, minimum/maximum positions, minimum/maximum accelerations, minimum/maximum jerks, and/or minimum/maximum jounces. As described herein, one or more of the kinematic motion constraints 582 may be dynamically adjusted by the kinematic motion constraints adjustment engine 520 in view of obstacles in the environment of the robot. For example, the kinematic motion constraints adjustment engine 520 may adjust one or more acceleration constraints for one or more actuators based on a current configuration of the robot relative to one or more obstacles, and the adjusted acceleration constraint(s) may be used in a given iteration of generating trajectories 588 by the trajectory generator 586 in lieu of "default" acceleration constraint(s) for the one or more actuators. Additional description of the engine 520 is provided below. In some implementations, the default acceleration constraints and/or other kinematic motion constraints may be determined in view of a dynamic model of the robot.

In some implementations, the trajectory generator 586 utilizes the target motion state 580, the kinematic motion constraints 582, and the current motion state 584 to generate a trajectory for each of the actuators. The trajectory generator 586 generates the trajectories to transfer the current motion state 584 of the actuators to the target motion state 580 of the actuators in view of the kinematic motion constraints 582. In some of those implementations, the trajectory generator 586 seeks to transfer the current motion state 584 to the target motion state 580 in a manner that is time-optimal in view of the current kinematic motion constraints 582. For example, where the current kinematic motion constraints 582 include one or more acceleration constraints that have been reduced by the engine 520, the trajectories 588 may transfer the current motion state 584 to the target motion state 580 in a manner that is time-optimal in view of those acceleration constraints, but that is less time-optimal than when non-reduced acceleration constraints are utilized.

In some implementations, to generate a trajectory for a given actuator, the trajectory generator 586 may select, from a finite group of motion profiles, a motion profile that transfers the given actuator from its current motion state to its target motion state within the shortest time possible while conforming to the current kinematic motion constraints 582 for that actuator. In some implementations, the trajectory generator 586 selects a motion profile based on decision trees. Each of the motion profiles of the finite group may include a velocity profile, an acceleration profile, and/or a jerk profile. Accordingly, the trajectory generated based on a selected motion profile may define motion states (e.g., positions, velocities, accelerations, jerks over time) for the given actuator.

The trajectory generator 586 may iteratively generate new trajectories 588 at each control cycle, in response to identifying a new target motion state 580, and/or in response to other signals. For example, at each control cycle the trajectory generator 586 may generate new trajectories 588 taking into account the current motion state 584 at that control cycle, the target motion state 580 at that control cycle, and the kinematic motion constraints 582 at that control cycle (as they may have been adjusted by engine 520 based on obstacles and/or the current motion state at that control cycle). Accordingly, through iterative generation of trajectories 588 and updating of kinematic motion constraints 582 by engine 520, trajectories provided for operating the actuators may dynamically adapted to reduce a chance of collision with one or more obstacles in the environment of the robot.

The kinematic motion constraints adjustment engine 520 determines, for each of the actuators being considered by trajectory generator 586, one or more of the kinematic motion constraints for the actuators for an upcoming iteration of the trajectory generator 586. For example, the engine 520 may determine, for each of the actuators, whether default and/or adjusted acceleration constraints should be used—and determine the adjusted constraints when they are used. In some implementations, the engine may determine the acceleration constraints for the actuators based on a current configuration of the actuators (e.g., as determined based on the current motion state 584) and based on a mapping of obstacles in configuration space and/or other data related to obstacles provided by obstacle detection engine 525.

Obstacle detection engine 525 detects obstacles in the environment of a robot and provides information related to those obstacles to engine 520. In some implementations, the obstacle detection engine 525 detects obstacles based on vision sensor data received from one or more vision sensors that are coupled to the robot and/or that otherwise view the environment of the robot. The vision sensor data may be, for example, two-dimensional ("2D") images, "2.5D" images that include a depth channel, and/or a three-dimensional ("3D") point cloud. The vision sensors may be, for example, a monographic camera (e.g., that generates 2D images), a stereographic camera (e.g., that generates 2.5D images with a depth channel), and/or a laser scanner (e.g., that generates a 3D point cloud). For example, the obstacle detection engine 525 may utilize one or more object detection and pose estimation techniques to determine poses of various objects in the environment and provide information related to those poses relative to one or more reference frames. For instance, the obstacle detection engine 525 may determine the pose of various objects, and map one or more of those objects in a configuration space of the robot based on their poses. For example, the obstacle detection engine 525 may define the obstacles by collision values in the configuration space, where the collision value of an obstacle at a given point in the configuration space indicates proximity of the obstacle to that point in the configuration space. For points in configuration space that are not within a threshold distance of any objects, a collision value may not be explicitly set for those points. Based on the collision value not being explicitly set, the kinematic motion constraints adjustment engine 520 may infer a collision value may that indicates no reduction in an acceleration constraint should occur. Alternatively, a collision value may be explicitly set that indicates that no reduction in an acceleration constraint should occur.

In some implementations, the obstacle detection engine 525 additionally and/or alternatively detects objects based on a stored map of the environment of the robot, where the map includes indications of the objects and their poses in the environment. The obstacle detection engine 525 may provide information related to those poses relative to one or more reference frames. For instance, the obstacle detection engine 525 may determine the pose of various objects based on the stored map, and map one or more of those objects in a configuration space of the robot based on their poses. For example, the obstacle detection engine 525 may define the obstacles by collision values in the configuration space, where the collision value of an obstacle at a given point in the configuration space indicates proximity of the obstacle to that point in the configuration space. Additional and/or alternative techniques may be utilized by the obstacle detection engine 525 to determine obstacles in an environment of a robot and/or to provide information related to those obstacles for use by the kinematic motion constraints adjustment engine 520. In various implementations, such as implementations where vision sensor data is utilized, the obstacle detection engine 525 may update information related to obstacles in real-time and/or other periodic or non-periodic intervals. In those implementations, the engine 520 may have access to updated obstacle information to enable one or more dynamic kinematic motion constraints to be adjusted in response to dynamic objects.

In some of the implementations where obstacle detection engine 525 maps obstacles in a configuration space of the robot, prior to a given iteration of the real-time trajectory generator, the engine 520 may determine the current configuration of the robot in the configuration space. In some of those implementations, if the current configuration of the robot in the configuration space has a collision value that indicates acceleration constraints should not be reduced, then the engine 520 may determine that default acceleration constraints should be used for the kinematic motion constraints 582 in an upcoming iteration of trajectory generator. Alternatively, where lack of a collision value indicates that acceleration constraints should not be reduced, the engine 520 may infer a collision value that indicates that acceleration constraints should not be reduced.

If the current configuration of the robot in the configuration space has a collision value that indicates acceleration constraints should be reduced, then the engine 520 may determine, for each of the actuators, how movements of the actuator alter the configuration in the configuration space. For a movement of the actuator that moves the configuration closer to objects (e.g., toward collision values in the configuration space that are more indicative of collision than those of the current configuration), the corresponding acceleration constraint for the actuator may be reduced in magnitude and the reduced value used in the given iteration of the real-time trajectory generator 586. In some of those implementations, the extent of the reduction may be based on the collision value for the current configuration in the configuration space and/or based on one or more neighboring collision values. For a movement of the actuator that moves the configuration farther from the objects (e.g., toward collision values in the configuration space that are less indicative of collision than those of the current configuration), a magnitude of the corresponding acceleration constraint for the actuator may be maintained or increased, and the maintained or increased value used in the given iteration of the real-time trajectory generator 586.

Figure 6:
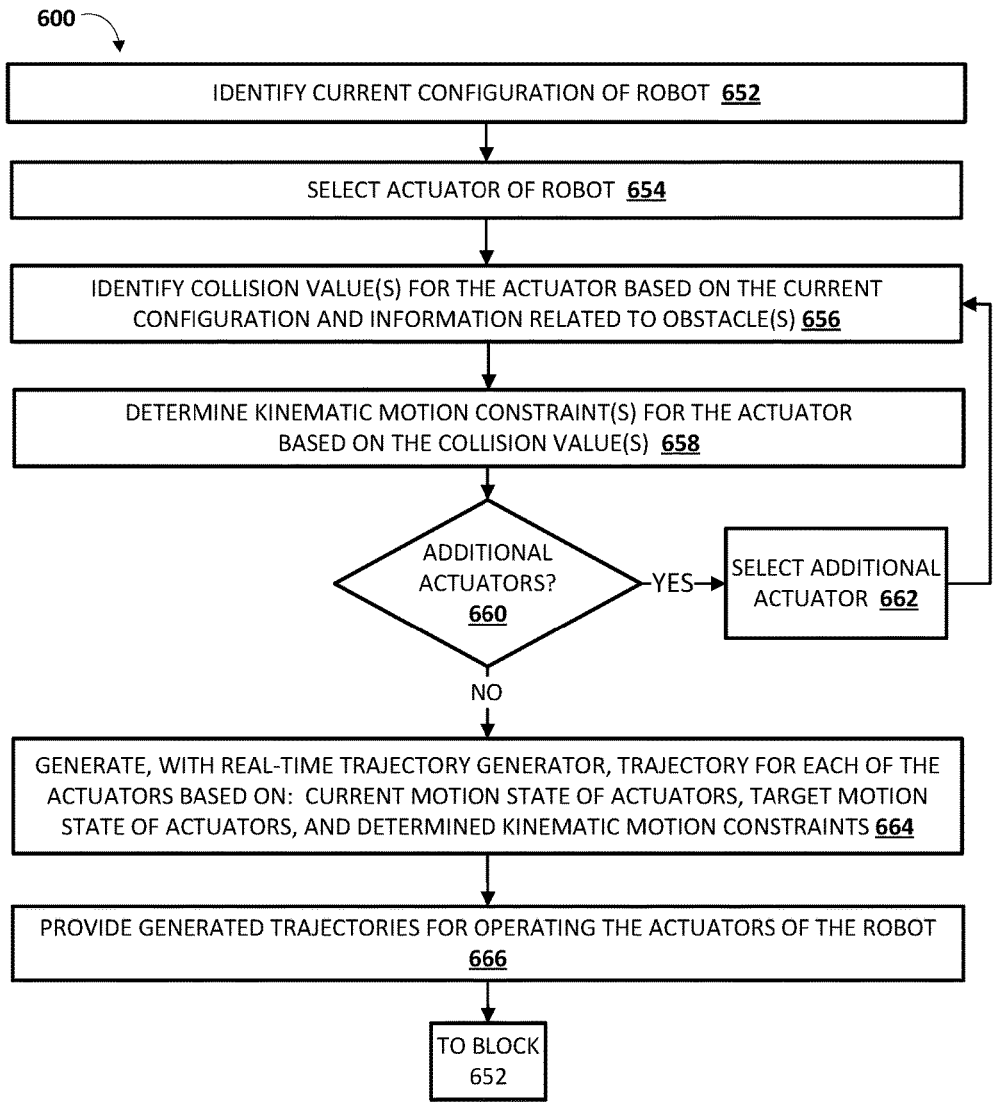
FIG. 6 is a flowchart illustrating an example method of implementations disclosed herein.

Turning now to FIG. 6, additional description is provided of various implementations of real-time generation of trajectories for actuators of a robot, where the trajectories are generated to lessen the chance of collision with one or more objects in the environment of the robot. FIG. 6 depicts a flow chart illustrating an example method 600 of some implementations disclosed herein. For convenience, the operations of the flow chart are described with reference to a system that performs the operations. This system may include trajectory generator 586 and/or kinematic motion constraints adjustment engine 520, which may be implemented by one or more components of a robot, such as a processor and/or robot control system of robot 100, robot 700 and/or other robot; and/or may be implemented by one or more computing device(s) that are separate from a robot, such as computing device 810. Moreover, while operations of method 600 are shown in a particular order, this is not meant to be limiting. One or more operations may be reordered, omitted or added.

At block 652, the system identifies a current configuration of a robot. The current configuration of the robot specifies the pose for each of a plurality of actuators of a robot for which trajectories are to be generated at block 664.

At block 654, the system selects an actuator of the robot.

At block 656, the system identifies collision value(s) for the actuator based on the current configuration and based on information related to one or more obstacles in the environment of the robot.

At block 656, if it is determined that the current configuration is not within a threshold proximity of any obstacles in the environment, collision values may be inferred or otherwise identified that indicate default acceleration constraints and/or other default kinematic motion constraints should be maintained. For example, a mapping of obstacles in a configuration space of the robot may be provided and it may be determined that no indications of obstacles are mapped to the point in the configuration space that corresponds to the current configuration. Based on such a determination, a first collision value for actuation of the actuator in the first direction and a second collision value for actuation of the actuator in the second direction may be inferred that both indicate a default acceleration constraint and/or other kinematic motion constraint should be maintained.

At block 656, if it is determined that the current configuration is within a threshold proximity of obstacle(s) in the environment, a first collision value may be identified based on how actuation of the actuator in a first direction changes the current configuration relative to one or more of the obstacles, and a second collision value may be identified based on how actuation of the actuator in a second direction changes the current configuration relative to one or more of the obstacles. For example, if the actuation of the actuator in the first direction moves the current configuration to a new configuration that is more proximal to one or more obstacles, then a first collision value may be identified that causes a reduction of a default acceleration constraint and/or other kinematic motion constraint. If, on the other hand, the actuation of the actuator in the first direction moves the current configuration to a new configuration that is farther away from one or more obstacles, then a first collision value may be identified that causes the default acceleration constraint to be maintained. A collision value for actuation of the actuator in the second direction may be similarly determined.

In some implementations, where the first and/or second collision value causes a reduction of the default acceleration constraint, the extent of the reduction may be based on proximity of the current configuration to one or more of the obstacles. For example, the collision value may be determined based on the collision value being included in a mapping of the obstacles in a configuration space of the robot. For instance, the collision value may be selected based on the collision value being assigned to the point in the configuration space to which the current configuration maps. As described herein, the collision value at a given point in the configuration space may be indicative of proximity of that point to one or more obstacles and may be, for example, a weighting factor or other weighting function.

At block 658, the system determines kinematic motion constraint(s) for the selected actuator based on the collision values identified at block 656. For example, where the collision values indicate default acceleration constraints and/or other default kinematic motion constraints should be maintained, the system may determine kinematic motion constraints for the selected actuator that include those default constraints.

Also, for example, where the first collision value for the actuator indicates a reduction to a first direction default acceleration constraint should occur, the system may determine a first direction acceleration constraint for that actuator that is reduced relative to the first direction default acceleration constraint. For example, the first direction default acceleration constraint may be a positive/maximum constraint of $1.0$ $m/s^2$ and it may be reduced based on the first collision value. On the other hand, where the first collision value for the actuator indicates the first direction default acceleration constraint should be maintained, the system may maintain the first direction default acceleration constraint. The second direction acceleration constraint may be similarly determined. It is noted that in some implementations both the determined first direction acceleration constraint and the determined second direction acceleration constraint may be reduced relative to their defaults, whereas in other implementations only one of the two may be reduced and the other maintained.

At block 660, the system determines whether additional actuators of the robot need to be analyzed. In other words, the system determines whether there are any remaining actuators for which kinematic motion constraints have not been determined based on the current configuration of block 652.

If the system determines at block 660 that there are additional actuators, the system proceeds to block 662 and selects an additional actuator. The system then proceeds to blocks 656 and 658 to determine kinematic motion constraints for the additional actuator selected at block 662. Multiple iterations of blocks 656, 658, 660, and 662 may be performed until all actuators are addressed. Although method 600 depicts kinematic motion constraints for the actuators being determined for the actuators sequentially, in various implementations kinematic motion constraints for one or more (e.g., all) of the actuators may be determined in parallel. For example, if it is determined that the current configuration is not within a threshold proximity of any obstacles in the environment, collision values may be inferred or otherwise identified at once for all actuators that indicate default acceleration constraints and/or other default kinematic motion constraints for all actuators should be maintained.

If the system determines at block 660 that there are not additional actuators, the system proceeds to block 664.

At block 664, the system generates a trajectory for each of the actuators with a real-time trajectory generator. The trajectories may be generated based on a current motion state of the actuators, a target motion state of the actuators, and the kinematic motion constraints of the actuators, including constraint(s) determined in one or more iterations of block 658.

As one example, to generate the trajectory for a given actuator, the system may select, from a finite group of motion profiles, a motion profile that transfers the given actuator from its current motion state to its target motion state within the shortest time possible in view of the determined kinematic motion constraints. In some implementations, the system selects a motion profile based on decision trees. Each of the motion profiles of the finite group may include a velocity profile, an acceleration profile, and/or a jerk profile. Accordingly, the trajectory generated based on a selected motion profile may define motion states (e.g., positions, velocities, accelerations, jerks over time) for the given actuator.

At block 666, the system provides the generated trajectories for operating the actuators of the robot. In some implementations, the system may generate control commands based on the generated trajectories—and the system may provide the control commands to drivers associated with the actuators for operating of the actuators.

In some implementations, the method 600 may proceed back to block 652, optionally after occurrence of one or more events, such as the passage of a threshold amount of time, receiving a new target motion state, an update to information related to obstacles, etc.

Figure 7:
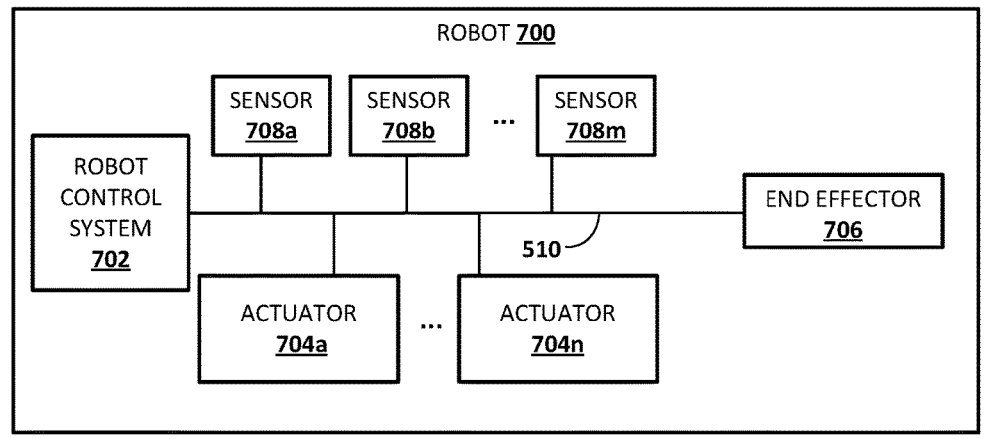
FIG. 7 schematically depicts an example architecture of a robot.

FIG. 7 schematically illustrates an example architecture of a robot 700. Robot 700 may take various forms, including but not limited to a robot arm similar to robot 200 described above, a humanoid form, an animal form, a wheeled device, a submersible vehicle, an unmanned aerial vehicle ("UAV"), and so forth.

Robot 700 includes a robot control system 702, actuators 704a-n, sensors 708a-m, and end effector 706. In various implementations, robot control system 702 may be operably coupled with one or more actuators 704a-n and/or one or more sensors 708a-m, e.g., via one or more buses 510. Sensors 708a-m may take various forms, including but not limited to position sensors, torque sensors, force sensors, light sensors, pressure sensors, pressure wave sensors (e.g., microphones), proximity sensors, accelerometers, gyroscopes, thermometers, barometers, and so forth. While sensors 708a-m are depicted as being integral with robot 700, this is not meant to be limiting. In some implementations, one or more sensors 708a-m may be located external to robot 700, e.g., as standalone units.

The robot control system 702 may be implemented in one or more processors, such as a CPU, GPU, and/or other controller(s) of the robot 700. In some implementations, the robot 700 may comprise a "brain box" that may include all or aspects of the control system 702. For example, the brain box may provide real time bursts of data to the actuators 704a-n, with each of the real time bursts comprising a set of one or more control commands that dictate, inter alia, the trajectory for each of one or more of the actuators 704a-n. In some implementations, the robot control system 702 may perform one or more aspects of method 600 described herein.

The control commands provided by robot control system 702 to actuators 704a-n include commands that direct the actuators 704a-n to move to traverse one or more trajectories generated according to techniques described herein. Moreover, the robot control system 702 may optionally determine current motion states of one or more actuators 704a-n and/or end effector 706 based on sensor feedback from one or more of the sensors 708a-m to generate trajectories in view of the motion states according to techniques described herein.

Although control system 702 is illustrated in FIG. 7 as an integral part of the robot 700, in some implementations, all or aspects of the control system 702 may be implemented in a component that is separate from, but in communication with, robot 700. For example, all or aspects of control system 702 may be implemented on one or more computing devices that are in wired and/or wireless communication with the robot 700, such as computing device 810.

Figure 8:
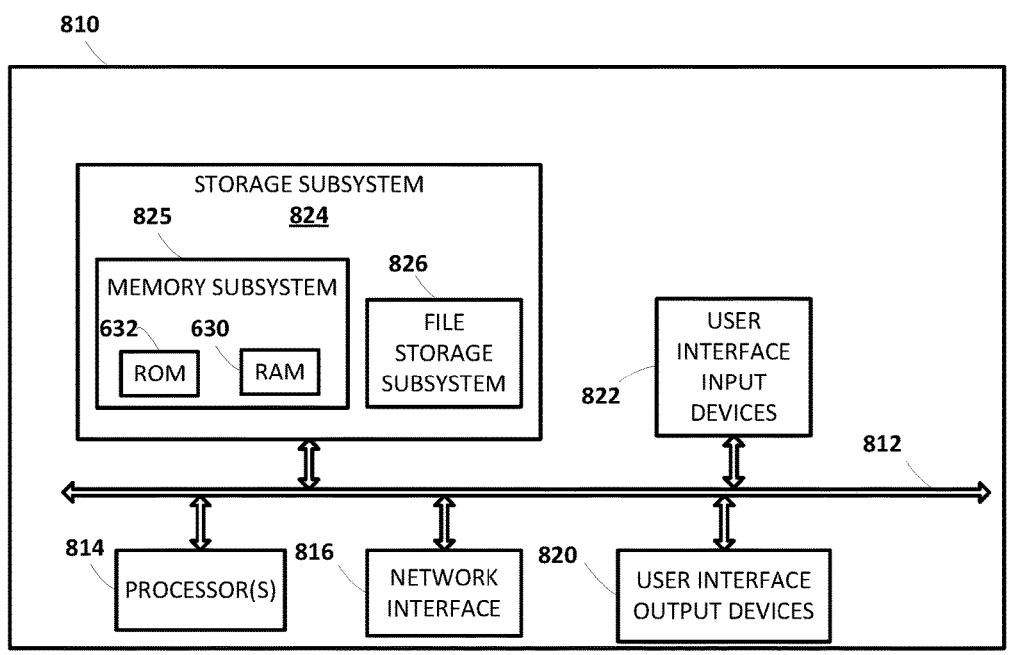
FIG. 8 schematically depicts an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 6 and/or of other methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors of a robot, comprising:
identifying a current configuration of a dynamic configuration of the robot, the current configuration of the robot specifying a pose for each of a plurality of actuators of the robot;
identifying, for each of the plurality of actuators of the robot:
a first collision value for actuation of the actuator in a first direction, and
a second collision value for actuation of the actuator in a second direction,
wherein the first collision value and the second collision value are each identified based on the current configuration and based on information related to one or more obstacles in an environment of the robot;
determining one or more first direction kinematic motion constraints for the actuators based on the first collision values of the actuators;
determining one or more second direction kinematic motion constraints for the actuators based on the second collision values of the actuators;
identifying a target motion state of the actuators of the robot;
generating, for each of the actuators in real-time, a trajectory that defines motion states for the actuator,
wherein the trajectories transfer a current motion state of the actuators to the target motion state of the actuators, and
wherein generating the trajectories is based on: the current motion state of the actuators, the target motion state, the first direction kinematic motion constraints of the actuators, and the second direction kinematic motion constraints of the actuators; and
providing the trajectories for operating the actuators of the robot.

2. The method of claim 1, wherein identifying the first collision value for a given actuator of the actuators comprises:
identifying the first collision value based on determining that actuation of the given actuator in the first direction causes a change to the dynamic configuration that causes the dynamic configuration to move closer to one or more of the obstacles; and
wherein determining the first direction kinematic motion constraint for the given actuator comprises reducing a default first direction kinematic motion constraint in view of the first collision value.

3. The method of claim 2, wherein the first collision value is a weighting function for modifying the first direction kinematic motion constraint for the given actuator, and wherein reducing the default first direction kinematic motion constraint is based on the weighting function.

4. The method of claim 3, wherein the weighting function is dependent on proximity of one or more of the obstacles to the current configuration.

5. The method of claim 1, wherein when actuation of a given actuator of the actuators in the first direction causes change to the dynamic configuration that causes the dynamic configuration to move closer to one or more of the obstacles:
the first collision value for the given actuator causes the determined first direction kinematic motion constraint for the given actuator to be of a lesser magnitude than the first direction kinematic motion constraint would be if the actuation of the given actuator in the first direction instead indicated change to the dynamic configuration that causes the dynamic configuration to move farther from the obstacles.

6. The method of claim 1, wherein the information related to the one or more obstacles includes a mapping of the one or more obstacles in a configuration space of the robot and wherein identifying the first collision value for a given actuator of the actuators comprises:
identifying the first collision value based on a mapping of the current configuration to the configuration space and based on the mapping of the obstacles in the configuration space.

7. The method of claim 6, wherein the mapping of the one or more obstacles in the configuration space includes a mapping of collision values in the configuration space, wherein each of the collision values indicates proximity to one or more of the obstacles.

8. The method of claim 7, wherein identifying the first collision value based on the mapping of the current configuration in the configuration space and based on the mapping of the obstacles in the configuration space comprises:
determining that the first collision value is the collision value mapped to the same point in the configuration space as the current configuration.

9. The method of claim 1, wherein identifying the first collision value for a given actuator of the actuators comprises:
identifying the first collision value based on determining that actuation of the given actuator in the first direction causes a change to the dynamic configuration that causes the dynamic configuration to move away from the obstacles; and
wherein determining the first direction kinematic motion constraint for the given actuator comprises maintaining a default first direction kinematic motion constraint in view of the first collision value.

10. The method of claim 1, wherein the one or more first direction kinematic motion constraints for the actuators determined based on the first collision measures of the actuators include acceleration constraints.

11. The method of claim 1, wherein determining the first direction kinematic motion constraint for a given actuator of the actuators comprises reducing a default first direction kinematic motion constraint for the given actuator based on the first collision value, and wherein determining the second direction kinematic motion constraint comprises maintaining a default second direction kinematic motion constraint for the given actuator based on the second collision value.

12. The method of claim 1, further comprising:
generating control commands based on the trajectories; and
providing the control commands to drivers associated with the actuators for operating of the actuators of the robot based on the trajectories.

13. The method of claim 1, wherein the target motion state is received from a path planner of the robot.

14. A method implemented by one or more processors of a robot, comprising:

identifying a current configuration of a dynamic configuration of the robot, the current configuration of the robot specifying a pose for each of a plurality of actuators of the robot;

determining, for a given actuator of the actuators of the robot and based on the current configuration:

a first kinematic motion constraint based on a first effect that would result from actuation of the given actuator, the first effect indicating change to the dynamic configuration relative to one or more obstacles;

identifying a target motion state of the actuators of the robot;

generating, for each of the actuators in real-time, a trajectory that defines motion states for the actuator, wherein the trajectories transfer a current motion state of the actuators to the target motion state of the actuators, and wherein generating the trajectory for the given actuator is based on: the current motion state of the actuators, the target motion state, the first kinematic motion constraints of the given actuator, and one or more additional kinematic motion constraints of the given actuator; and providing the trajectories for operating the actuators of the robot.

15. The method of claim 14, wherein determining the first kinematic motion constraint based on the first effect that would result from actuation of the given actuator comprises:

determining that actuation of the given actuator in a first direction corresponding to the first kinematic motion constraint causes a change to the dynamic configuration that causes the dynamic configuration to move closer to one or more of the obstacles; and in response to determining that the first kinematic motion constraint causes the change, determining the first kinematic motion constraint by reducing a default first direction kinematic motion constraint.

16. The method of claim 15, wherein determining the first kinematic motion constraint based on the first effect that would result from actuation of the given actuator further comprises:

identifying a collision value based on a mapping of the one or more obstacles in a configuration space of the robot and based on a mapping of the current configuration to the configuration space; and determining the first direction kinematic motion constraint based on the collision value.

17. The method of claim 16, wherein each of the collision values indicates proximity to one or more of the obstacles.

18. The method of claim 16, wherein identifying the collision value based on the mapping of the current configuration in the configuration space and based on the mapping of the obstacles in the configuration space comprises:

determining that the first collision value is the collision value mapped to the same point in the configuration space as the current configuration.

19. A robot comprising:

a plurality of actuators;

one or more processors configured to:

identify a current configuration of a dynamic configuration of the robot, the current configuration of the robot specifying a pose for each of the actuators of the robot;

determine, for a given actuator of the actuators of the robot and based on the current configuration:

a first kinematic motion constraint based on a first effect that would result from actuation of the given actuator, the first effect indicating change to the dynamic configuration relative to one or more obstacles;

identify a target motion state of the actuators of the robot;

generate, for each of the actuators, a trajectory that defines motion states for the actuator, wherein the trajectories transfer a current motion state of the actuators to the target motion state of the actuators, and wherein generating the trajectory for the given actuator is based on: the current motion state of the actuators, the target motion state, the first kinematic motion constraints of the given actuator, and one or more additional kinematic motion constraints of the given actuator; and provide the trajectories for operating the actuators of the robot.

* * * * *